United States Patent [19]
Brous et al.

[11] Patent Number: 5,345,379
[45] Date of Patent: Sep. 6, 1994

[54] SYSTEM FOR CONTROLLING ACCESS TO SUBSYSTEMS

[76] Inventors: James H. Brous, 10196 E. Bullard Ave., Clovis, Calif. 93612; Eugene S. Carlson, 764 N. Fine, Fresno, Calif. 93727

[21] Appl. No.: 716,410

[22] Filed: Jun. 17, 1991

[51] Int. Cl.⁵ .............................................. G06F 15/20
[52] U.S. Cl. .................... 364/146; 364/138; 235/382; 340/825.34
[58] Field of Search ................. 364/140–147, 364/478, 479, 401, 138, 139; 235/380, 381, 382, 382.5, 375; 340/825.3, 825.31, 825.32, 825.33, 825.34, 825.35

[56] References Cited

U.S. PATENT DOCUMENTS

| | | | |
|---|---|---|---|
| 4,024,379 | 5/1977 | Pfost et al. | 235/449 X |
| 4,167,322 | 9/1979 | Yano et al. | 364/525 X |
| 4,197,988 | 4/1980 | Moss et al. | 235/381 X |
| 4,278,879 | 7/1981 | Hofmann et al. | 235/380 |
| 4,575,622 | 3/1986 | Pellegrini | 235/382 |
| 4,577,061 | 3/1986 | Katzeff et al. | 340/825.33 |
| 4,766,548 | 8/1988 | Cedrone et al. | 364/479 |
| 4,780,806 | 10/1988 | Wada et al. | 364/146 |
| 4,847,894 | 7/1989 | Chanvin et al. | 379/106 |
| 4,907,250 | 3/1990 | Ricks | 364/479 |
| 4,972,463 | 11/1990 | Danielson et al. | 379/91 |
| 5,014,212 | 5/1991 | Smith | 364/479 |
| 5,046,157 | 9/1991 | Smith et al. | 235/382.5 X |
| 5,091,713 | 2/1992 | Horne et al. | 340/825.35 X |
| 5,146,403 | 9/1992 | Goodman | 364/479 X |
| 5,159,560 | 10/1992 | Newell et al. | 364/479 |

Primary Examiner—Joseph Ruggiero
Attorney, Agent, or Firm—Worrel & Worrel

[57] ABSTRACT

A control system for controlling the operation of a subsystem, such as an appliance, through independent cycles of operation, the system having, in the preferred embodiment, a magnetically encoded card for receiving and storing information identifying an operator; a relay operably connected to the subsystem for initiating operation of the subsystem through a cycle of operation; a card reader for reading the magnetically encoded card to identify the operator; a control board operable individually to determine, according to predetermined criteria, if an operator is entitled to a cycle of operation of the subsystem; and a communications network interconnecting the card reader, control board and relay whereby, upon presentation reading of the magnetically encoded card by the card reader to determine the operator, the control board determines if the operator is entitled to a cycle of operation and, if so determined, the relay is operated to initiate a cycle of operation of the subsystem.

16 Claims, 4 Drawing Sheets

SYSTEM FOR CONTROLLING ACCESS TO SUBSYSTEMS

BACKGROUND OF THE INVENTION

1. Field of the Invention

The present invention relates to a control system and, more particularly, to such a control system which is particularly well suited to controlling access to subsystems, such as appliances or the like, permitting usage without the necessity of handling coinage and the innumerable problems associated therewith.

2. Description of the Prior Art

There are a variety of environments in which the operation and control of subsystems is replete with problems which not only interfere in general with the efficient operation of those subsystems, but also render their usage so unattractive as to be unacceptable.

For example, apartment complexes, university residence halls, military bases, commercial establishments and the like characteristically maintain laundry facilities accessible to authorized persons for the purpose of washing and drying clothing. Typically, such facilities provide for operation of the appliances through the use of coinage. Thus, the prospective operator inserts the required combination of coins into the coin mechanism of the appliance to initiate its operation. In the first place, such usage is inconvenient because the prospective operator may not have the required combination of coins. For this purpose, many commercial establishments employ money changing machines on site so that the prospective operators can obtain the required combination of change. However, such money changing machines are notoriously subject to breakdown, may not have the required combination of coins to dispense and frequently are the target of tampering and theft. Still further, whether or not such money changing machines are known to be present, it is evident that the patrons must be carrying money. As a consequence, the patrons of such facilities are at some degree of risk for robbery. This risk is aggravated by the fact that patrons frequently must use such facilities in the evening hours after dark when security may be uncertain.

Similarly, the money receiving mechanisms of the respective appliances are plagued by breakdown due to jamming, overuse and improper use. They also serve as an attractive target for theft. Since such theft frequently involves an attempt to break into the coin box of the machine, damage not only to the coin mechanism, but also the appliance itself is frequently the result. Such coin mechanisms are frequently the target for various schemes to avoid payment such as by using slugs, or the insertion of objects into the coin slots in an attempt to trigger the operation of the appliance.

Notwithstanding the foregoing, perhaps the most significant problem associated with the use of coinage in the operation of appliances is the fact that it is inconvenient to the prospective operators. The necessity for obtaining the correct combination of coins in the necessary quantity is tedious, time consuming and generally offensive. Similarly, the carrying of the required combination of coins, once obtained, is onerous in that it is bulky, heavy and not readily handled.

While prior art efforts have included the on site dispensing of tokens, and the on site issuance of single use cards, all such prior art efforts have proved inadequate and therefore unsatisfactory. They are typically complicated and expensive devices, one of which must individually be mounted on each of the appliances.

There are still other more obscure problems which plague businesses which provide such facilities. These problems may generally be categorized as those attendant to the business operations themselves. These include the need to travel regularly to each of the facilities; collect from all of the coin boxes; tabulate the income from each site; maintain business records; institute in house security procedures to prevent skimming; circulate frequently through all of the facilities to ensure that the appliances are maintained in working order; and service and repair the money changing equipment. The need daily to perform all or most of these operations is expensive both in terms of the number of employees required as well as in the other direct expenses associated therewith. Furthermore, it is notoriously the case that income from such operations frequently goes unreported in income tax returns and therefore is not taxed. Conversely from the point of view of the persons using the appliances, the conventional need to gauge pricing to the coinage such as in twenty-five cent (25¢) increments means that the price charged for each cycle of operation is higher than would otherwise be the case.

Therefore, it has long been known that it would be desirable to have a control system capable of conveniently, dependably and accurately controlling access to subsystems such as appliances avoiding the necessity for using coinage and thereby avoiding the host of problems associated therewith while ensuring that the prospective operators are able to use such appliances with a convenience and reliability promoting continued usage.

SUMMARY OF THE INVENTION

Therefore, it is an object of the present invention to provide an improved control system for controlling access to and operation of subsystems such as appliances and the like.

Another object is to provide such a control system which has particular utility in controlling access to such appliances as washing machines, drying machines and other such appliances which are characteristically maintained for use in apartment complexes, university housing complexes, military bases, commercial establishments and the like.

Another object is to provide such a control system which precludes the use of coinage at any point in the operation of the subsystems so as to avoid the multiplicity of problems conventionally associated with such usage.

Another object is to provide such a control system which permits prospective operators of appliances to make a single monthly prepayment for a selected number of cycles of operation of the appliances thereby obtaining the right to such usage of the appliance in the selected number of cycles without dependance upon coinage for such usage.

Another object is to provide such a control system which operates to prevent unauthorized persons from using such appliances and reduces to an absolute minimum the attractiveness of such facilities to tampering, theft, robbery and the like.

Another object is to provide such a control system which is not subject to the malfunction of which prior art control systems are characterized and which operates with a speed making the initiation of such operation virtually instantaneous while being trouble free.

Another object is to provide such a control system which alerts a prospective operator when the number of cycles of operation for which he authorized falls below a predetermined minimum so as to alert the prospective operator of the need to purchase more cycles of operation well before the number authorized is entirely depleted.

Another object is to provide such a control system which monitors, updates, interrogates and otherwise controls a multiplicity of individual geographically disparate sites each having a plurality of appliances from a remote location virtually without personnel having to travel to the sites except for purposes of servicing or repairing the appliances.

Another object is to provide such a control system which can be operated to prevent a prospective operator from selecting an inoperable appliance as well as from having a cycle of operation of the appliance deleted from his account when an inoperative appliance has been selected.

Another object is to provide such a control system which is capable of determining what appliances are inoperative, the frequency of use of each appliance at each site, the frequency of use of appliances by each authorized operator and a variety of other data all from a remote control location.

Further objects and advantages are to provide improved elements and arrangements thereof in an apparatus for the purpose described which is dependable, economical, durable and fully effective in accomplishing its intended purpose.

These and other objects and advantages of the present invention are achieved, in the preferred embodiment of the control system of the present invention, by having a card for receiving and storing information identifying an operator; a mechanism operably connected to the subsystem for initiating operation of the subsystem through a cycle of operation; a card reader for reading the information stored on each card means to identify the operator; a control board operable individually to determine, according to predetermined criteria, if an operator, identified by the card reader, is entitled to a cycle of operation of the subsystem; and a communication system operably interconnecting the card reader, control board and initiating mechanism whereby, upon presentation of the card by a prospective operator to the card reader, the card reader reads the information to determine the operator, the control board determines if the operator is entitled to a cycle of operation and, if so determined, the initiating mechanism is operated to initiate a cycle of operation of the subsystem.

DESCRIPTION OF THE PREFERRED EMBODIMENT

Figure 3:
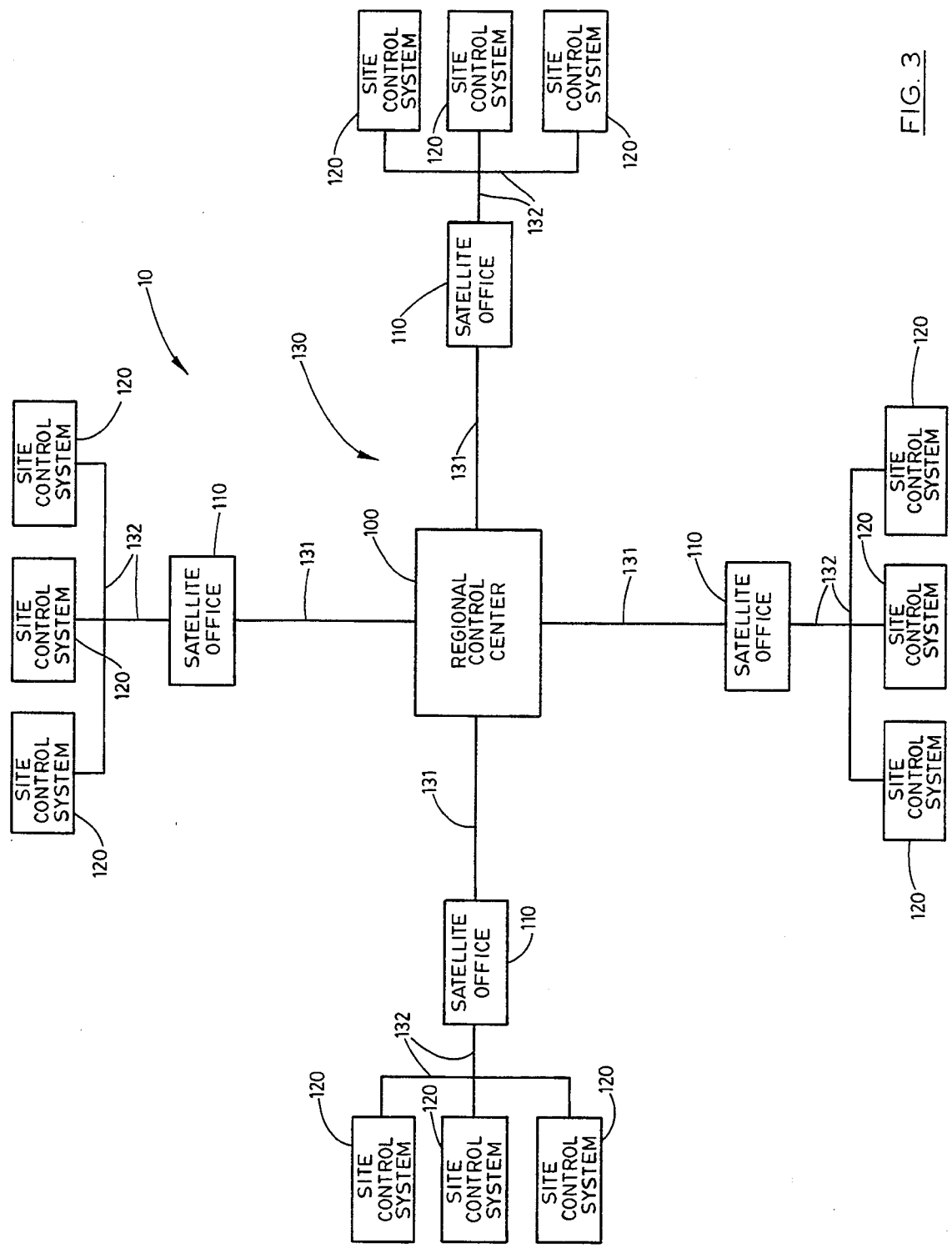
FIG. 3 is a diagrammatic view of the control system of the present invention showing a regional control system for operating a plurality of site control systems constituting individual operational systems of the control system of the present invention.

Referring more particularly to the drawings, the control system of the present invention is generally indicated by the numeral 10 in FIG. 3. As will hereinafter become more clearly apparent, the control system of the present invention can be employed in a wide variety of different embodiments to control the operation of a wide variety of types of subsystems. The subject invention is not limited to operation of any specific type, or class of subsystems. Similarly, the control system of the present invention is not limited to the specific details of any particular electronic systems or circuits, but rather the invention resides broadly in the combination of which the preferred embodiment is a representative example. However, the control system of the present invention has particular utility in the preferred embodiment hereinafter set forth.

Figure 1:
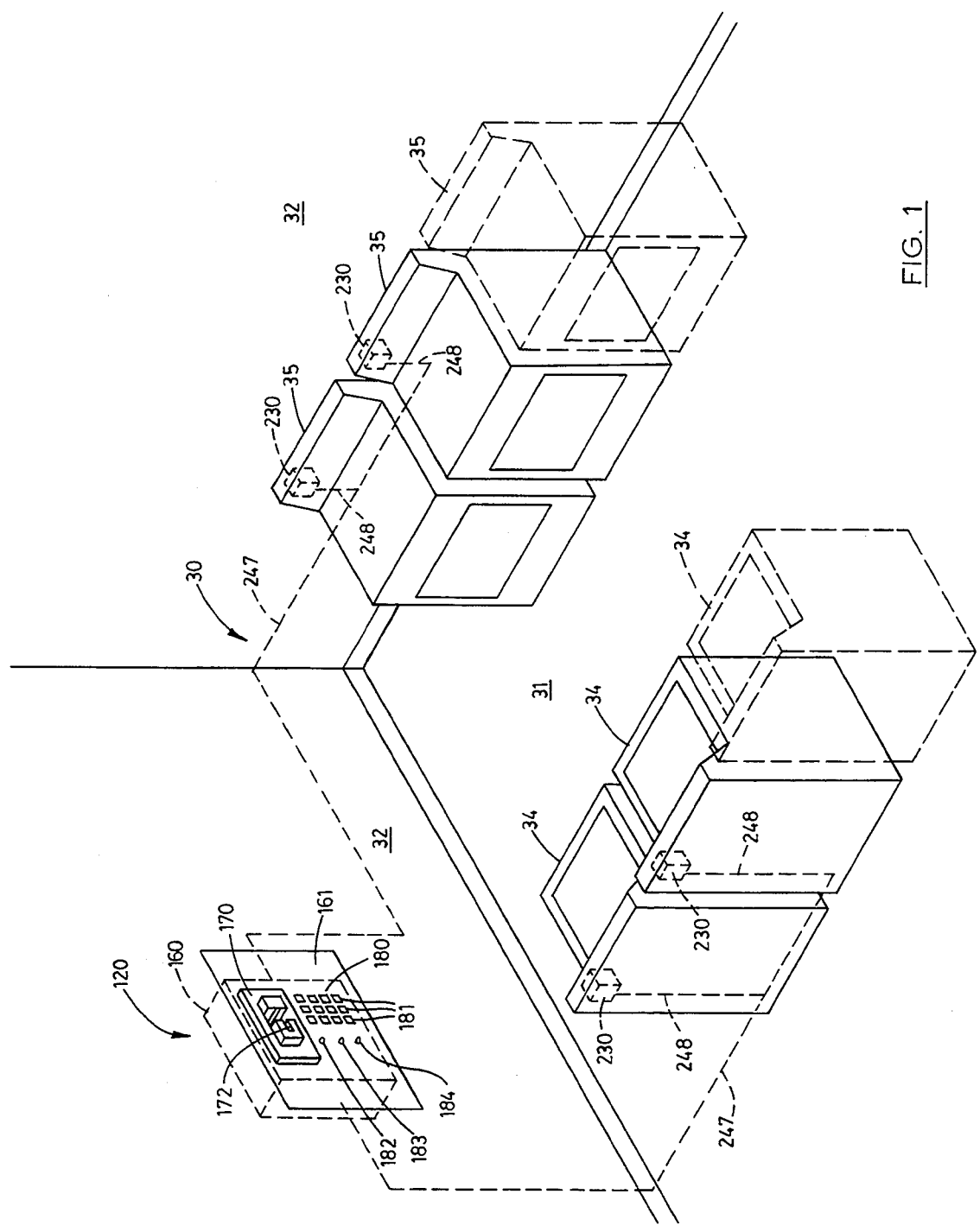
FIG. 1 is a fragmentary, perspective view of an illustrative environment for the control system of the present invention, in this case, a laundry facility.

The representative environment within which the control system shown herein to operate is a laundry facility 30 shown best in FIG. 1. The laundry facility is intended to represent, for illustrative convenience, a laundry or utility room such as are commonly found in apartment complexes, university residence halls, planned housing developments, military bases, commercial establishments and the like. In the illustrative environment of the laundry facility 30, the facility has a floor 31 bounded by upstanding walls 32. A plurality of appliances or washing machines 34 are mounted in side-by-side relation on the floor. Representative of a characteristic arrangement, a plurality of other appliances or drying machines 35 are mounted in side-by-side relation on the floor facing in spaced relation to the washing machines. It will be understood that the washing and drying machines are in all respects, except as hereinafter set forth, entirely conventional. The washing and drying machines however have been modified so as not to be rendered operable with coinage nor by use of the conventional manual controls. However, once operation is initiated, as hereinafter described, the washing and drying machines are fully operable using the conventional controls thereof.

The numbers of appliances which can be controlled using the control system of the present invention at any site is essentially unlimited as will hereinafter become more clearly apparent. The numbers of appliances shown in FIG. 1 are merely intended to symbolize a multiplicity of such appliances.

As previously noted, the control system 10 of the present invention is best shown diagrammatically in FIG. 3. The control system has a regional control center generally indicated at 100. The control system has a plurality of satellite offices 110. The control system has a plurality of site control systems 120 associated with each of the satellite offices. It will be understood that the regional control center has a master computer system, not shown, operable to receive, maintain and manage the identities, accounts, billing and payment of prospective operators or users of the machines controlled using the control system. It will be understood that any suitable computer system and software can be employed for the purpose. Similarly, it will be understood that the regional control center and the master computer system thereof can, if desired, be linked to a national or other regional control centers and the computer systems thereof. There may be more or fewer satellite offices and site control systems as best suits the needs of the operation.

In many instances, the numbers of prospective operators in the area to be serviced by the control system determine the specific arrangement of the control system in this regard. For example, in a sparsely populated area, a single satellite office 110 may be entirely appropriate to control only a few site control systems 120 without connection to a regional control center 100. In heavily populated areas, it may be more appropriate to have a regional control center linked to a plurality of satellite offices each of which is itself linked to a multiplicity of site control systems. It may also be desirable to have a national control center linked to a plurality of regional control centers in turn linked to a multiplicity of satellite offices each of which is linked to any appropriate number of site control systems. The control system of the present invention is entirely flexible in these regards.

In the described embodiment hereof, the regional control center 100, satellite offices 110 and site control systems 120 are interconnected as shown in FIG. 3 by a regional control system generally indicated at 130. The region control system is a diagrammatic representation of the system and may be composed of any suitable links such as by telephone lines, radio transmission, microwave transmission, or the like. In the illustrative embodiment, the regional control system is interconnected in the manner represented diagrammatically in FIG. 3 by telephone lines accessed through modems. Thus, the regional control system has modem links 131 interconnecting the regional control center 100 with each of the satellite offices 110 through telephone lines. Similarly, modem links 132 interconnect each individual satellite office 110 and its respective site control systems 120 through telephone lines.

The control system 10 of the present invention employs a microprocessor or computer 150 which accesses each of the site control systems 120 associated with an individual satellite office 110. Preferably, although not necessarily, the computer 150 is physically housed in the satellite office 110 for the site control systems associated therewith. The computer itself can be of any suitable type adapted to the specific needs and capacities of its respective site control systems 120. The computer is operatively connected to each of the site control systems 120, as will otherwise hereinafter be described, through telephone lines accessed through modems and diagrammatically represented in FIG. 2 by a modem link 151.

One of the site control systems 120 of the control system 10 is shown in FIG. 1. The site control system includes a housing 160 mounted within the wall 32 at a position convenient for access by prospective operators of the washing machines 34 and drying machines 35. A face plate 161, preferably of metal, is mounted on the wall 32 in covering relation to the housing 160. The face plate serves the purpose not only of mounting some of the components of the control system hereinafter to be described and protecting the more delicate internal components contained within the housing, but also to display indicia, not shown, such as operator instructions, service marks, advertising, and the like.

The site control system 120 has a reader, or magnetic card reader 170 of a type operable to read information encoded magnetically on a card in operation of the control system. The magnetic card reader is preferably, although not necessarily, a model number 110 TD manufactured by American Magnetics of Carson, Calif. The magnetic card reader is, in itself, conventional having a housing 171 extending outwardly through the face plate 161 and having a card slot 172 adapted to receive a magnetic card upon insertion by a prospective operator.

The site control system 120 has an alphanumeric key pad assembly 180 mounted within the housing 160 and having a plurality of keys 181, individually bearing indicia, extending through openings individual thereto in the face plate 161. The key pad assembly mounts a red light 182, a yellow light 183 and a green light 184 for purposes hereinafter described, The key pad assembly is preferably, although not necessarily, an alphanumeric key pad assembly model number 705-100 manufactured by CECO of Plantation, Fla.

The site control system 120 has a modem 190 preferably entirely fully contained within the housing 160 so as to be protected by the face plate 161 from tampering. The modem is preferably, although not necessarily, a Zoom modem MX manufactured by Zoom Telephonics Inc. of Boston, Mass.

The site control system 120 has a control board 200 of any suitable type configured to perform the various functions hereinafter set forth. The control system of the present invention is not limited in any respect to any particular type of control board. However, the control board, in the preferred embodiment is programmable and has sufficient memory capacity to handle the functions hereinafter described including keeping track of a multiplicity of authorized users, individually keeping track of the numbers of cycles of use of each appliance connected thereto and being accessed by the computer 150 to receive updated user information therefrom and to transmit its stored data to the computer 150. A transformer 210 is mounted within the housing 161 behind the face plate 161 so as to be protected from tampering. A power source, such as a conventional electrical outlet is indicated at 220 in FIG. 2. The transformer is preferably, although not necessarily, a Class 2 transformer manufactured by Bassler Electric of Highland, Ill.

The site control system 120 of the preferred embodiment includes a rendering means relay 230 of any suitable type mounted on and in controlling relation to each of the washing machines 34 and drying machines 35. Preferably the relays are mounted internally of their respective washing machines and drying machines so as to be isolated to prevent tampering. Each relay is operatively linked to the internal control system of its respective machine so as to be capable of turning the machine on to run one cycle of operation. Each relay may be viewed as capable of being placed in a first mode of operation, in which it is inactive but available to be activated, and a second mode of operation, in which it is activated to turn on its respective machine. In the case of machines which have been retrofitted with the relays, the normal conventional controls of the machine for initiating operation of the machine are disconnected or removed so that the machine cannot be operated using such conventional controls.

Figure 2:
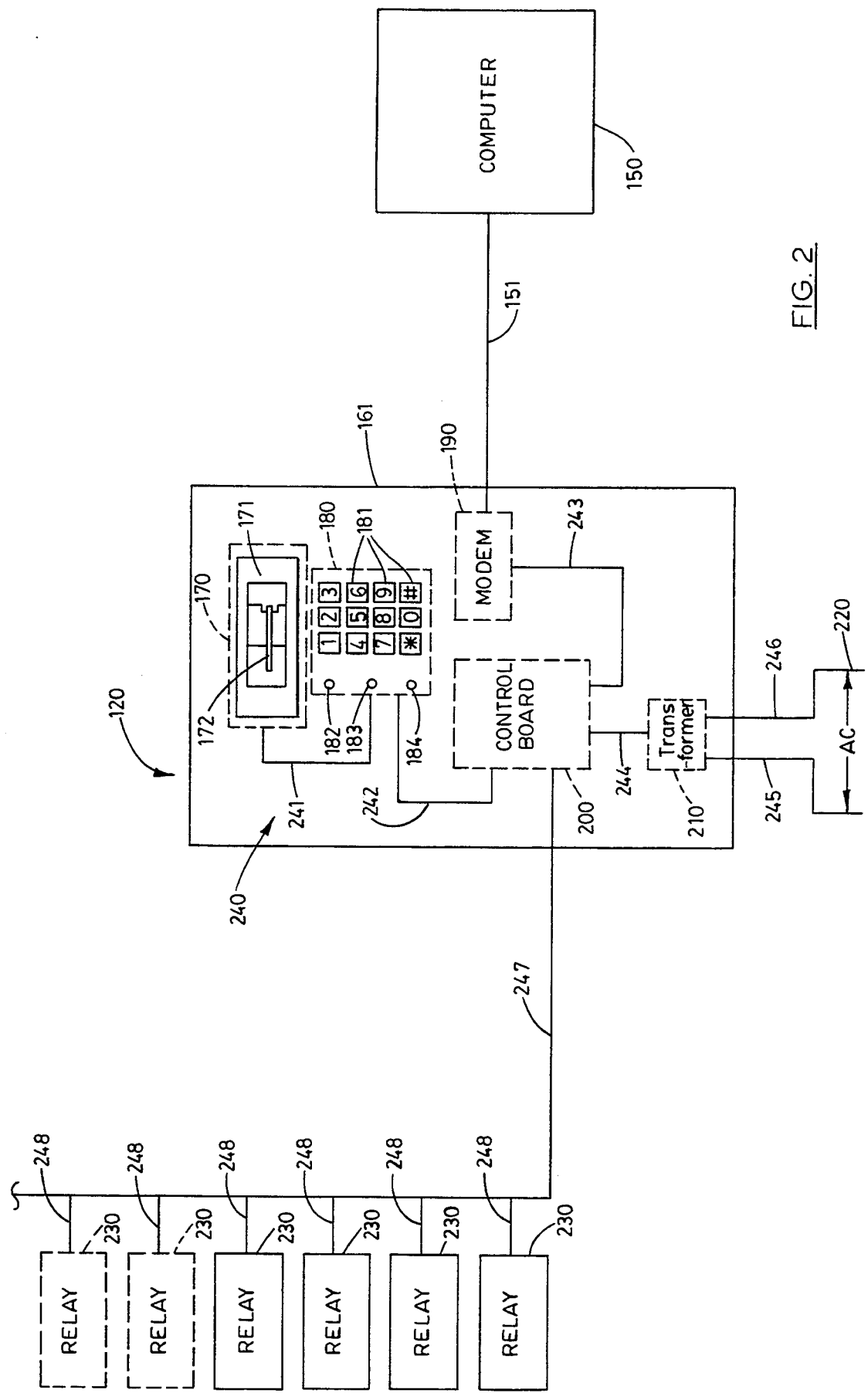
FIG. 2 is a somewhat enlarged fragmentary, diagrammatic view of a site control system of the control system of the present invention.

In the preferred embodiment, the site control system 120 has a site electrical control system 240 which is shown diagrammatically in FIG. 2. The site electrical control system includes an electrical link 241 operatively interconnecting the magnetic card reader 170 and the key pad assembly 180. An electrical link 242 operatively interconnects the key pad assembly and the control board 200. An electrical link 243 operatively interconnects the control board and the modem 190. An electrical link 244 operatively interconnects the control board 200 and the transformer 210. A pair of electrical links 245 and 246 operatively interconnect the power source 220 and the transformer 210. An electrical link 247 operatively interconnects the control board 200 and is itself interconnected in parallel relation to each of the relays 230 individual to the washing machines 34 and drying machines 35.

As previously noted, the operative components of the regional control system 130 can be operatively interconnected by any suitable communication links. Similarly, in the alternative, the control board 200 can be linked to the relays 230 in controlling relation thereto by radio signal. In this event the control board has a radio transmitter, not shown, and each of the relays has a radio receiver, also not shown. Any other suitable communication links can also be employed if desired.

Figure 4:
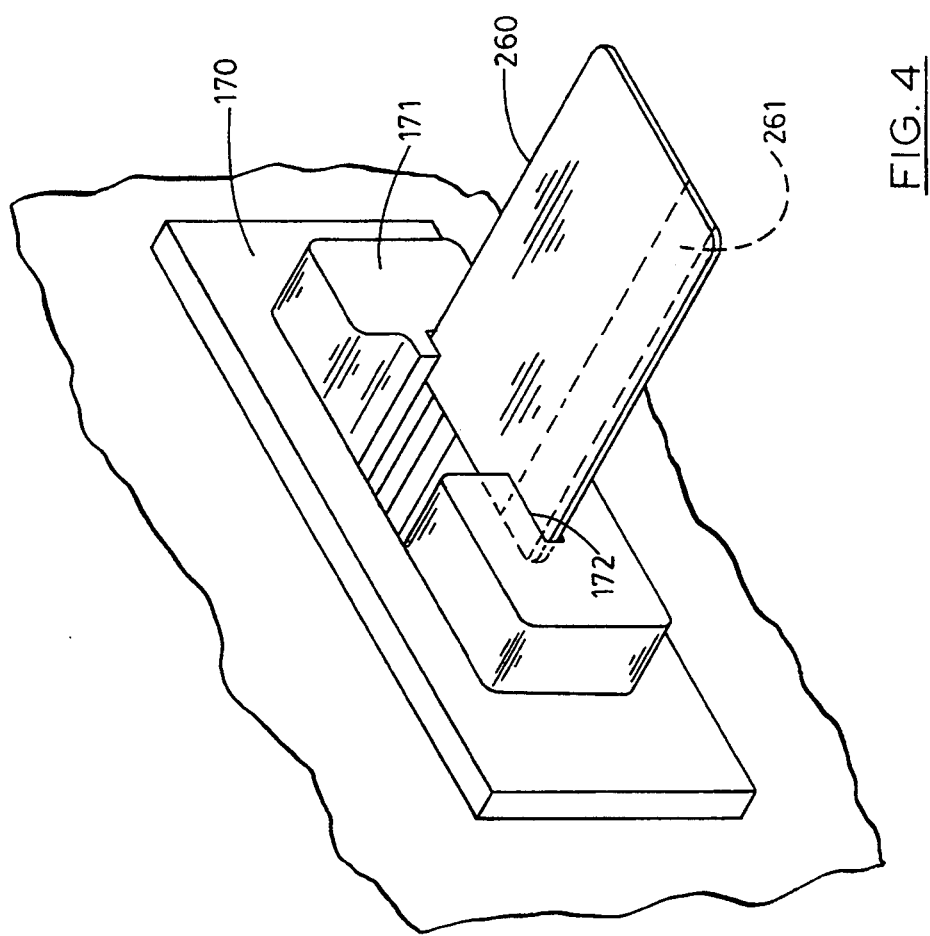
FIG. 4 is a somewhat enlarged, fragmentary perspective view of the magnetically encoded card inserted in the card reader both of the present invention.

As shown in FIG. 4, the control system includes a receiving and storing means, identifier or magnetically encoded card 260. The card is preferably constructed of a suitable plastic material and is of a generally rectangular configuration. The card is of a size and thickness such as to be slidably receivable in the card slot 172 of the magnetic card reader 170. The card has a magnetic strip 261 which can be encoded with information revealing the identity of the person to whom it was issued. Any suitable magnetically encodeable card can be employed for the purpose such as one manufactured by American Magnetics of Carson, Calif.

In the embodiment of the control system shown in FIG. 3, it will be understood that a master computer, not shown, is maintained in the regional control center linked to the computers 150 of the respective satellite offices 110 by the modem links 13 1. The master computer is operable to download information to the computers 150 and to retrieve information therefrom.

OPERATION

The operation of the described embodiment of the present invention is believed to be readily apparent and is briefly summarized at this point. For purposes of distinguishing between the two, the word "owner" shall be used to identify the business entity, or entities owning and providing the control system and subsystems, in this case appliances, for use by authorized users. The word "prospective operator" will be used to identify the persons, or customers, wishing to use the subsystems or appliances.

As previously noted, the control system 10 can take a variety of specific embodiments and, similarly can be operated in a variety of ways most suited to the needs of the owner thereof. In the described embodiment of the control system, the owner employs suitable computer programs in the computers 150 and the master computer to receive data attributable to persons authorized to operate the appliances controlled by the control system. Normally, although not necessarily, authorization to operate the appliances is achieved by the prospective operator paying for a given number of cycles of operation of the appliances at a given rate. The owner can discriminate as to the rate for such usage as among the appliances such as, for example, to charge more for washing machines than for drying machines. Such payment is made, for example, by mail or in person to the regional control center. If desired, this can be done on a regular monthly basis.

Thus, for example, if a given prospective operator pays for 20 cycles of operation of the appliances at his respective laundry facility 30, this information is loaded into the master computer at the regional control center, downloaded by the master computer through the regional control system 130 to the computer 150 of the satellite office 110 for that laundry facility. The computer 150 then downloads the information through the modem link 151, modem 190 and electrical link 243 to the control board 200. The control board retains that information in memory until updated by the computer 150 from the master computer, or until one or more cycles of operation of the appliances of the laundry facility have been used attributable to that prospective operator. Thus, the control board of the site control system of the specific laundry facility possesses information indicating that the given prospective operator is authorized to use any of the appliances at that laundry facility through a total of 20 cycles of operation. The master computer frequently accesses the individual computers 150 to tabulate the number of cycles of operation paid for and used by the given prospective operator and compiles the information. Similarly, the computer 150 of each satellite office frequently accesses the control boards of the respective site control systems to update the information regarding the number of cycles paid for by each prospective operator and the number of cycles used from each prospective operator. Thus, both the master computer, the computer and the control board of a particular laundry facility all have the most recent information regarding each prospective operator for the given laundry facility.

The owner of the control system 10 dispenses the magnetically encoded card 260 to each authorized prospective operator. As previously noted, the magnetically encoded card is encoded with information identifying for computer purposes the identity of the prospective operator associated therewith. The purpose for the card is solely to permit computer identification of the prospective operator, or, in the case of someone else using the card, the person to whom the prospective operator's usage of the appliance should be deducted. While, depending upon the preference of the owner of the control system, an authorized prospective operator could provide the card for use by others resulting in the debiting of his account, if the card is stolen or lost, the prospective operator can promptly notify the regional control center 1 00 of such loss or theft. In this event, the main computer is loaded with this information for purposes of canceling authorization on the card involved and a new card is issued to the prospective operator restoring full credit for the number of cycles of operation to which he is entitled. This information is, of course, downloaded to the appropriate computer 150 and control board 200 of the specific laundry facility for which use is authorized thereby permitting the prospective operator to use the appliances at that laundry facility. Similarly, the lost or stolen card is not thereafter usable.

Operation of a given site control system 120 can best be understood upon reference to FIGS. 1, 2, and 4. The prospective operator goes to the authorized laundry facility 30 at which the washing machine 34 and/or drying machine 35 are desired for use. The prospective operator selects an available washing machine or drying machine and loads the clothing to be handled into the machine in the normal fashion using soap or other additives as desired.

The prospective operator then inserts his respective magnetically encoded card 260 into the card slot 172 of the magnetic card reader 170 as shown in FIG. 4. The magnetic card reader then reads the information encoded onto the magnetic strip 261 of the card and transmits that information through electrical conductor 241, key pad assembly 180, and electrical link 242 to the control board 200. The control board rapidly interprets the information received from the card reader to identify the prospective operator as an authorized prospective operator so indicating by eluminating the green light 184. Conversely, if the control board does not interpret the information received from the card reader to identify an authorized prospective operator, no signal is provided. If the control board interprets the information to determine that it is of an authorized potential operator, but all cycles of operation for which payment has been made have been used, the red light 182 is illuminated to indicate that operation of the appliances will not be permitted.

Where authorization is indicated by illumination of the green light 184, the prospective operator, utilizing the keys 181 of the key pad assembly, depresses the keys in accordance with the instructions to load the number of the appliance desired for use into the site control system 120. If the appliance so identified is operable, the control board 200 immediately places the relay 230 of that appliance in the second mode of operation to initiate normal operation of the appliance through a single cycle of operation. The operator then simply operates the appliance as normal. The control board 200 deducts one cycle of operation from the prospective operator's account once the relay has been deployed in its second mode to operate the appliance.

An additional function of which the control system 10 of the present invention is capable includes the ability to advise each prospective operator each time the card is used in the event the number of cycles of operation for which he is authorized falls below a predetermined minimum. Thus, for illustrative convenience, the owner of the control system 10 may decide to so notify each prospective operator when the number of cycles of operation for which he has authorized falls below five. In this illustrative example, when a prospective operator inserts the magnetically encoded card into the magnetic card reader 170, the information read by the card reader is transmitted as previously described to the control board 200. Where the control board has been configured to notify the prospective operator that the number of authorized cycles is below 5, a signal is transmitted along the electrical link 242 to the key pad assembly 180 first to eluminate the yellow light 183, signaling the prospective operator of this fact, and then, after a predetermined but relatively brief period, to illuminate the green light 184 to indicate to the prospective operator that usage of the appliance is authorized.

Therefore, the control system of the present invention conveniently, dependably and accurately controls access to subsystems such as appliances avoiding the necessity for using coinage and thereby avoiding the host of problems associated therewith while ensuring that the prospective operators are able to use such appliances with a convenience and reliability promoting continued usage thereof.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. A control system for limiting the operation of appliances at a first site to authorized users, the control system comprising:

A. a plurality of cards individually encoded with identifying information for a prospective operator of said appliances;

B. a card reader at the first site for reading said identifying information encoded on said cards exposed thereto;

C. a plurality of relays individually connected to said appliances and individually deployable in a first mode, wherein said relay is available for operation but not operative, and a second mode, wherein said relay operates to render its respective appliance operative;

D. a control board for receiving authorizing information indicating those perspective operators authorized to use the appliances, for interpreting said identifying information read by said card reader relative to said authorizing information to determine whether or not the prospective operator identified by said identifying information is authorized to operate the appliances and, if so, to place one of said relays in the second mode;

E. a computer, located at a second site remote from said first site, for receiving said authorizing information identifying prospective operators who are authorized to use said appliances and transmitting said authorizing information to said control board at the first site; and F. communication means linking the computer, the card reader, the control board, and the relays for supplying said authorizing information to the control board from the computer, for supplying said identifying information read by the card reader to the control board for determination of whether or not the prospective operator identified by said identifying information is authorized to operate the appliances and for placing one of said relays in the second mode upon the control board determining that said prospective operator is authorized to operate the appliances whereby said appliances are discriminately made available for operation only by authorized prospective operators.

2. The control system of claim 1 wherein the computer receives and supplies to said control board operator data evidencing the number of cycles of operation for which said prospective operators are individually authorized to operate said appliances and deletes by one the number of cycles of operation for which each prospective operator is authorized upon the placing of a relay of an appliance in said second mode as the result of the card reader reading said identifying information identifying said prospective operator.

3. The control system of claim 1 including

G. signal lights mounted in the vicinity of said card reader and connected by said communication means to the control board for indicating to a prospective operator having exposed a card to the card reader whether or not operation of an appliance is authorized.

4. The control system of claim 3 wherein the appliances are each operable through a cycle of operation after which said operation terminates requiring that its respective relay again by placed in the second mode to initiate operation of the appliance in a next successive cycle of operation, and wherein the computer receives operator data evidencing the number of said cycles of operation for which said prospective operators are individually authorized to operate said appliances, transmits said operator data to the control board and the signal lights are operated by the control board through said communication means to indicate to the prospective operator when only a predetermined minimum number of cycles of operation are authorized.

5. The control system of claim 4 wherein each of the appliances has a code and the control system includes H. a key pad, connected through said communication means to the card reader and the control board, having a plurality of independently actuable keys selectively operable by a prospective operator to indicate a code of an appliance desired to be operated and wherein said control board places the relay of said appliance desired for operation in the second mode upon determining that a prospective operator is authorized to operate the appliances.

6. The control system of claim 1 wherein said plurality of cards, card reader, plurality of relays and control board constitute a single site control system at said first site and wherein there are a plurality of said single site control systems at a plurality of other sites and said computer is linked to said plurality of single site control systems for receiving said authorizing information and transmitting said authorizing information to the control boards of the plurality of single site control systems.

7. The control system of claim 6 wherein said appliances are each operable through a cycle of operation after which said operation terminates requiring that its respective relay again be placed in the second mode to initiate operation of the appliance in a next successive cycle of operation, and wherein the computer receives operator data evidencing the number of cycles of operation for which said prospective operators are individually authorized to operate said appliances and transmits said operator data to the control boards of the plurality of single site control systems and wherein said computer interrogates the control boards of said plurality of single site control systems to update its operator data for each prospective operator authorized to use the appliances.

8. The control system of claim 7 wherein said computer transmits said operator data for said prospective operators only to one said single site control system for any given prospective operator.

9. The control system of claim 8 wherein payment is made at said second site by each of said prospective operators who wishes to be authorized to use the appliances of one of said single site control systems and once said payment is made by a prospective operator the authorizing information and operator data for said prospective operator are loaded into the computer.

10. A system for controlling access to a plurality of subsystems at a first site for discriminately rendering the subsystems available for operation only by authorized prospective operators, the system comprising means connected to said subsystems for rendering the subsystems individually operable through predetermined periods of operation; an identifier for designating a prospective operator; a reader for reading the identifier to identify said prospective operator designated thereby; a control means interconnecting said rendering means, identifier and reader for identifying said prospective operator, upon the reader reading the identifier and rendering a subsystem operable through said predetermined period of operation; and a computer at a second site remote from said first site for supplying authorizing information to the rendering means indicating those prospective operators who are authorized to use said subsystems and permitting the rendering means to render a subsystem operable through said predetermined period of operation.

11. The system of claim 10 wherein said rendering means includes a plurality of relays individually connected to the subsystems and individually deployable in a first mode, wherein said relay is available for operation but not operative and a second mode, wherein said relay operates to render the subsystem thereof operable.

12. The system of claim 10 wherein said identifier is a card magnetically encoded for information identifying the authorized prospective operator and the reader is a magnetic card reader for reading said information encoded on said card exposed thereto.

13. The system of claim 10 including a plurality of rendering means individually connected in controlling relation to a plurality of said subsystems, a plurality of identifiers individually bearing information identifying prospective operators and a determining means individually connected through said control means with the plurality of rendering means and with the reader for receiving operator data indicating those prospective operators authorized to use the subsystems, interpreting said information read by the reader relative to the operator data to determine whether or not the prospective operator identified by said information is authorized to operate the subsystems and, if so authorized, activating one of said rendering means to render one of the subsystems operable for the predetermined period of operation.

14. The system of claim 13 wherein the determining means receives operator data evidencing a number of cycles of operation for which said prospective operators are individually authorized to operate said subsystems and deleting by one of the number of cycles of operation for which any given prospective operator is authorized upon activating one of said rendering means as the result of the reader reading said information identifying said given prospective operator.

15. The system of claim 14 wherein said plurality of rendering means, plurality of identifiers, reader, determining means and control means constitute a single site control system and wherein there are a plurality of said single site control systems and including a computer linked to said plurality of single site control systems for receiving said operator data and individually transmitting said operator data to the determining means of the plurality of single site control systems.

16. A control system for limiting the operation of appliances at a first site to authorized users, the control system comprising:

A. a plurality of cards individually bearing identifying information for a prospective user of said appliances;

B. a card reader at the first site for reading said identifying information borne by a card exposed thereto;

C. a plurality of mechanisms individually connected to said appliances and individually deployable in a first mode, in which said appliance thereof is not operative, and a second mode, in which said appliance thereof is operative;

D. a control board for receiving and storing authorizing information indicating those prospective users authorized to use the appliances and, where the card reader reads identifying information borne by a card exposed thereto which identifies a prospective user authorized to use said appliances as indicated by said authorizing information, for placing one of the mechanisms of one of said appliances in said second mode;

E. a computer, located at a second site remote from said first site, for receiving said authorizing information identifying prospective users who are authorized to use the appliances and transmitting said authorizing information to said control board; and F. a communication system for interconnecting the computer, control board, card reader and mechanisms for transmission of said authorizing information from the computer to the control board and for placing one of said mechanisms of an appliance in said second mode upon the card reader reading a card bearing identifying information which corresponds to said authorizing information received from the computer thereby indicating that the prospective user is authorized to use said appliances at the first site.

* * * * *

UNITED STATES PATENT AND TRADEMARK OFFICE
CERTIFICATE OF CORRECTION

PATENT NO. : 5,345,379

DATED : September 6, 1994

INVENTOR(S) : JAMES H. BROUS; EUGENE S. CARLSON

It is certified that error appears in the above-identified patent and that said Letters Patent is hereby corrected as shown below:

Column 1, line 48, delete ":fre-" and substitute ---fre----.

Column 4, line 24, between "system" and "shown" insert ---10 is---.

Column 6, line 44, between "means" and "relay" insert ---or---.

Column 7, line 36, delete "13 1" and substitute ---131---.

Column 8, line 48, delete " 1 00" and substitute ---100---.

Column 12, line 42, delete "of" between "one" and "the".

Signed and Sealed this

First Day of November, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,345,379

DATED : September 6, 1994

INVENTOR(S) : James H. Brous; Eugene S. Carlson

It is certified that error appears in the above-indentified patent and that said Letters Patent is hereby corrected as shown below:

Column 9, line 52, delete "eluminate" and substitute ---illuminate---.

Signed and Sealed this

Twenty-ninth Day of November, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,345,379

DATED : September 6, 1994

INVENTOR(S) : James H. Brous; Eugene S. Carlson

It is certified that error appears in the above-identified patent and that said Letters Patent is hereby corrected as shown below:

Column 11, line 1, delete "by" and substitute

---be---.

Signed and Sealed this

Thirtieth Day of May, 1995

Attest:

BRUCE LEHMAN

*Attesting Officer*  *Commissioner of Patents and Trademarks*